United States Patent [19]

Åkerlund

[11] 4,178,065
[45] Dec. 11, 1979

[54] SPHERICALLY SHAPED TRIANGULAR MIRROR DEVICE

[76] Inventor: Nils G. Åkerlund, Rönnbergagatan 32, S-72346 Vesteras, Sweden

[21] Appl. No.: 901,490

[22] Filed: May 1, 1978

[51] Int. Cl.² .............................................. G02B 7/18
[52] U.S. Cl. .................................................... 350/295
[58] Field of Search ............... 350/295, 304, 293, 307; 248/479, 480

[56] References Cited

U.S. PATENT DOCUMENTS

| | | | |
|---|---|---|---|
| 1,255,039 | 1/1918 | Otte | 350/307 |
| 1,986,033 | 1/1935 | Trufant | 350/295 |
| 2,911,177 | 11/1959 | West | 350/304 |

Primary Examiner—Jon W. Henry
Attorney, Agent, or Firm—Burns, Doane, Swecker & Mathis

[57] ABSTRACT

The present invention discloses a mirror device which is useful in preventing customers from carrying away items from stores without first placing them on recording counters for recording and payment. The mirror device includes a spherically shaped disc with a triangular configuration which has a mirrored outwardly curved surface. The disc is pivotably attached to a carrier member which is in turn pivotably attached to a support member. The disc may be set in several inclined positions relative to the support members. The curvature of the mirrored surface may be adjusted by a wire which is attached to two corner portions of the disc.

2 Claims, 3 Drawing Figures

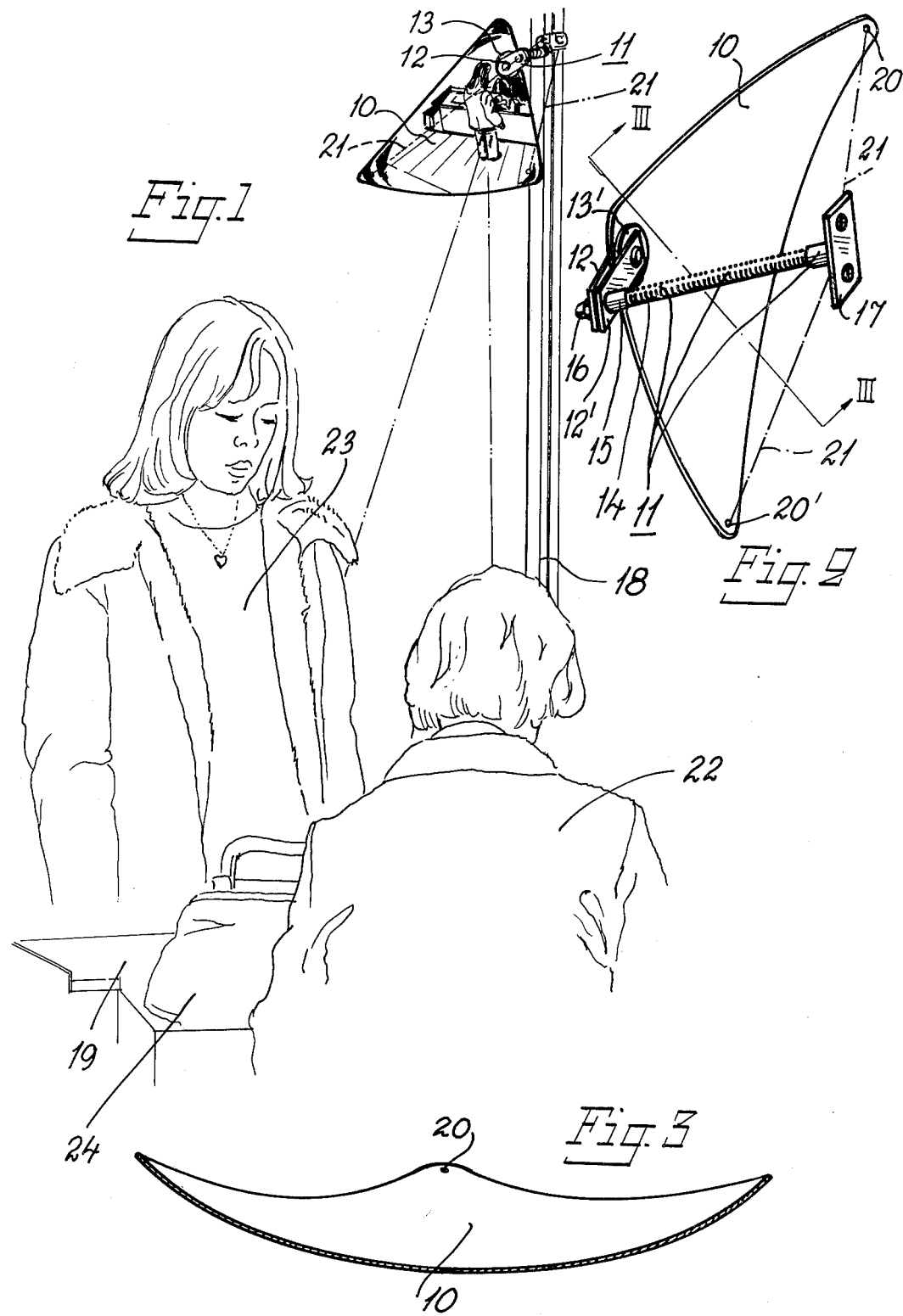

SPHERICALLY SHAPED TRIANGULAR MIRROR DEVICE

The present invention relates to a mirror device which preferably is intended for shop control, especially at so called self-service recording counters.

Cashiers who serve the self-service recording counters in shops have difficulties in checking if the customer carries away items without first placing them on the recording counters for recording and payment.

Frequently it happens that customers place certain items in lower portions of the body or in carriages, shoppers and baskets located in a plane below the recording counters.

Primarily cashiers have to concentrate on the items that are placed on the recording counters and secondly on cash registers. Besides, there usually is a great hurry since frequently there are long gueues of customers to be served.

For a long time there has been a need for a device which can be used by the cashiers for quickly and efficiently checking to see that all items carried to the counter are registered and paid for by the customers so that the loss of items may be decreased considerably.

By means of a mirror device according to the present invention said need is fulfilled in an extremely simple and efficient manner.

The mirror device according to the invention substantially is characterized in that it comprises a spherically shaped disc, the outwardly curved surface of which is acting as a mirror. The disc is provided with a carrier member fixedly attachable to the disc and a support member. The carrier member is rotatably settable in several different positions so that the disc may be set in several inclined positions relative to the support member.

Furthermore, the mirror device is characterized in that the disc is of triangular shape having rounded corner portions.

A further characteristic feature of the mirror device is that the carrier member comprises two elongated and rigid plates griping around two opposite surfaces of the disc. First end portions of the plates are provided with support washers of resilient material and are arranged for abutment against the opposite surfaces of the disc. Second end portions of the plates are provided with holes whereby the first end portion of an elongated flexible bar is attached to the plate with a clamping action. At the second end portion thereof, the bar is rigidly connected to a clamping member rigidly attached to the support member.

In the following the mirror device according to the invention will be further elucidated with reference to the accompanying drawings.

FIG. 1 shows a perspective view of the mirror device mounted on a vertically placed post arranged adjacent to a cash register.

FIG. 2 shows in a larger scale and in perspective view a view of the mirror device seen from the back side thereof.

FIG. 3 shows a cross section of the mirror device along the line III—III in FIG. 2.

The reference numeral 10 in the figures represents the spherical disc which is of triangular shape and the outwardly curved surface of which is acting as a mirror. At one corner portion of the disc 10 there is attached a carrying member, generally denoted by 11, which is settable in different positions. The carrying member 11 comprises two elongated plates 12, 12' of rigid material having one end portion gripping around the disc 10. At said end portion the plates are provided with washers 13, 13' of resilient material, for instance soft plastic, and said washers 13, 13' abut against opposite surfaces of the disc 10. The plates 12, 12' are held together with clamping action by means of a flexible rod 14, preferably of spring type material. At one end portion thereof the rod is provided with a threaded pin 15 whereon a nut 16 is arranged. At the second end portions thereof the plates 12, 12' are provided with holes and are attached on said pin 15 and are clamped against each other by a nut 16, whereby the plates 12, 12' are clamped against each other and against the washers 13, 13'. The washers abut against the two surfaces of the disc 10 with clamping action and thereby carries the same at the carrying member 11. At the other end portion thereof the rod 14 is provided with an attachment plate 17 for attachment to a support member 18, for instance in the shape of a vertically placed post, arranged adjacent to the recording counter 19.

The disc 10 may be provided with a pair of holes 20, 20' in which a steel wire 21 or similar means may be attached, as shown in FIG. 2. The curvature of the disc may be varied by tensioning the wire 21 (which is illustrated as a broken line in FIG. 2) with the wire being clamped at the attachment plate 17. The area surveyed by the mirror is thus controllable by varying the disc curvature.

The disc 10 and the carrying member 11 thereof are attached in a plane above the head of the cashier and are so directed that the mirror image comprises the region the customers have to pass. By a quick glance in the mirror device, the cashier 22 can see if the customer 23 carries items which normally are not visible, since the articles are in a position below the register counter, in that observation field which is available in the serving position, i.e., when the cashier sits at the register counter 19 and the cash register 24. The cashier 22 may self direct and set the mirror device in such a manner that it completely covers the observation field that is necessary, which is individually suitable, as clearly appears from FIG. 1.

The support member 18 may also comprise a wall or another suitable element, and the carrying member 11 may be of another known construction. The main point is that the mirror device is settable in such a manner that the mirror image covers the necessary observation area in the position of the cashier when serving customers. Thus, by means of the mirror device according to the invention it is possible for the cashiers to survey the necessary area without having to move from the working plate, i.e. adjacent to the register counter 19 and the cash register 24.

Of course, the mirror device according to the invention may have a different shape from what has been shown. Thus, the disc 10 for instance may be polygonal and the carrier device may be of another previously known construction. The main point of the invention is to provide the necessary survey and control effect for the cashier.

What I claim is:
1. A mirror device, comprising:
   a spherically shaped disc of triangular shape having rounded corner portions and having an outwardly curved surface which acts as a mirror;

a carrying member rigidly attachable to the spherically shaped disc, the carrying member being attachable to a support member and being hingedly settable in different positions so that the disc is settable in several inclined positions relative to the support member, the carrying member including two elongated and rigid plates gripping around two opposite surfaces of the disc, at first end portions thereof said plates being provided with support washers of resilient material arranged for abutment against the opposite surfaces of the disc, and at second end portions thereof the plates being provided with holes, whereby one end portion of an elongated flexible rod is attachable to said plates, and at the second end portion thereof the rod is fixedly attached to an attaching member which is fixedly attachable to the support member.

2. A mirror device according to claim 1, wherein at at least two corner portions the disc is provided with through holes in which end portions of a wire are attachable, the corner portions of the disc being supportingly clampable towards each other by said wire, whereby the curvature of the spherical surface of the disc may be varied.

* * * * *